Patented Mar. 5, 1935

1,993,610

UNITED STATES PATENT OFFICE 1,993,610

LACHRYMATORY GAS

Kenneth A. Kobe, Minneapolis, Minn.

No Drawing. Application March 25, 1931,
Serial No. 525,331

18 Claims. (Cl. 167—47)

This invention relates to a composition for producing lachrymating gases, employed to cause irritation of the mucous membrane of the eyes, nose and throat, and, as a consequence, uncontrollable lachrymation, sneezing, coughing and general nausea calculated to incapacitate a person exposed to the gases.

A great many different substances or materials are suitable for use in the production of lachrymating gases, but usually halogenated organic compounds or compositions which contain some other functional group are employed. In the usual methods of projection, the compounds or compositions are allowed to evaporate, ordinarily being vaporized by heat, or shot from guns. If a compound or composition is very volatile, or if heat is applied to a less volatile compound or composition, a high concentration is immediately obtained, but a concentration so obtained may be readily dissipated by ventilation, and may not be effective as a deterrent in a criminal act. For example, were such a compound or composition released from a safe being "jimmied" or blown at night, the criminal would be able to return after a short time, when the vapors had been reduced below the necessary concentration, to complete the job. If a compound or composition is not sufficiently volatile, the concentration immediately obtained may be ineffective to accomplish the intended purpose, as, for example, to deter a criminal from completing an unlawful act.

It is the object of the present invention to provide a lachrymating compound or composition wherein will be incorporated a comparatively volatile component and a relatively less volatile, more persistent component combined in such a manner that a predetermined high initial concentration of deterrent agencies will be formed when the compound or composition is projected and, at the same time, a residue will be left which will be vaporized or otherwise dispersed at a comparatively slow rate to maintain the irritating atmosphere, at desired high concentration, for a relatively long period of time in spite of attempts which may be made to ventilate an enclosure or space in which the compound or composition is projected.

A lachrymating compound or composition made according to the invention may consist of five parts more or less of chloracetophenone combined with twenty-five parts more or less of chloropicrin. This mixture when released will initially produce a requisitely high concentration of chloropicrin, and as and when the concentration of chloropicrin disappears, the residue of chloracetophenone will maintain a concentration of lachrymator of the desired intensity at the location of release of the compound or composition for a considerable period of time even though attempts at ventilation be made.

As comparatively volatile components of my compound or composition in addition to chloropicrin, the following among others may be mentioned:—chloracetone, bromacetone, methyl and ethyl bromacetates, acetyl chloride and chloracetyl chloride. As relatively less volatile, more persistent components in addition to chloracetophenone and its derivatives, the following among others may be mentioned:—brombenzyl cyanide, benzyl bromide, xylyl bromide and methyl and ethyl iodoacetates. The ratio of volatility between the comparatively volatile component and the relatively less volatile, more persistent component may vary between wide limits.

In addition to the components for causing irritation, there may be present in the compound or composition a solvent more volatile than the comparatively volatile lachrymator so that the rapid evaporation of the solvent will hasten the vaporziation of the comparatively volatile component and aid in its distribution throughout the atmosphere. For this purpose, the polychlor derivatives of methane may be used, such, for example, as methylene chloride, chloroform and carbon tetrachloride. Thus, the compound or composition above described consisting of five parts more or less of chloracetophenone combined with twenty-five parts more or less of chloropicrin may be dissolved in from twenty-five to one hundred parts of methylene chloride to produce a mixture which is suitable to the intended purposes.

In cases where the volatility of the comparatively volatile component may be too great so that said component may vaporize extremely rapidly, a solvent less volatile than this component may be employed, which solvent will retard the volatility of the very volatile component, that is, the comparatively volatile component, so that this cannot give an exceedingly high initial concentration which might be toxic instead of irritant. For this purpose, the polychlor derivitives of the higher hydrocarbons, among other substances, may be employed, as, for example, tetrachlorethane.

It is usually necessary, however, to aid the vaporization of the comparatively volatile component, and this can be accomplished by the addition to the compound or composition of a volatile agent which reacts in an exothermic manner with the moisture present in the atmosphere. Evidently, the heat produced by the reaction of the volatile, exothermic agent will aid in procuring a rapid evaporation of the comparatively volatile component with a consequent production of a satisfactorily high initial concentration of chemical agent. As examples of volatile, exothermic agents among others, which may be employed, the following may be mentioned:—the chlorides of phosphorous, surfuric, sulfurous, silicic, titanic and stannic acids, and the chlorides of sulfur. Thus, the compound or composition consisting of five parts more or less of chloracetophenone combined with twenty-five parts more or less of chloropicrin, either with or without methylene chloride or other suitable solvent, may additionally include ten parts more or less of stannic chloride to produce a mixture suitable to the intended purposes.

It will of course be understood that the disclosure herein is merely illustrative of the principle of the invention and intended in no way in a limiting sense, changes in the proportions of the various components of the compound or composition and the incorporation in said compound or composition of a plurality of substances or materials to comprise any or all of said components, instead of a single substance or material as described, being permissible within the scope of the claims which follow. That is to say, the comparatively volatile component, as well as each of the other components of the compound or composition, can in a particular instance, consist of a plurality of suitable substances or materials, for example chloropicrin and chloracetone, instead of a single suitable substance or material, for example, chloropicrin.

What I claim is:

1. A composition of irritating and disabling agents consisting of a comparatively volatile component and a relatively less volatile, more persistent component combined in such a manner that a predetermined high initial concentration of deterrent agencies will be formed when said composition is projected and a residue will be left which will be dispersed at a comparatively slow rate to maintain an irritating and disabling atmosphere at desired high concentration for a relatively long period of time.

2. A composition of irritating and disabling agents consisting of a comparatively volatile component and a relatively less volatile, more persistent component combined in such a manner that a predetermined high initial concentration composed by said comparatively volatile component will be formed when said composition is projected and a residue composed by said relatively less volatile, more persistent component will be left which will be dispersed at a comparatively slow rate to maintain an irritating and disabling atmosphere at desired high concentration as and when the concentration composed by said comparatively volatile component disappears and for a long period of time thereafter.

3. A composition of irritating and disabling agents consisting of chloropicrin and chloracetophenone.

4. A composition of irritating and disabling agents consisting of approximately twenty-five parts of chloropicrin and approximately five parts of chloracetophenone.

5. A composition of irritating and disabling agents consisting of a comparatively volatile component, a relatively less volatile, more persistent component, and a solvent, the whole combined in such a manner that a predetermined high initial concentration of deterrent agencies will be formed when said composition is projected and a residue will be left which will be dispersed at a comparatively slow rate to maintain an irritating and disabling atmosphere at desired high concentration for a relatively long period of time.

6. A composition of irritating and disabling agents consisting of a comparatively volatile component, a relatively less volatile, more persistent component, and a solvent more volatile than said comparatively volatile component, the whole combined in such a manner that a predetermined high initial concentration composed by said comparatively volatile component will be formed at least partially with the aid of said solvent when said composition is projected and a residue composed by said relatively less volatile, more persistent component will be left which will be dispersed at a comparatively slow rate to maintain an irritating and disabling atmosphere at desired high concentration as and when the concentration composed by said comparatively volatile component disappears and for a long time thereafter.

7. A composition of irritating and disabling agents consisting of chloropicrin, chloracetophenone and methylene chloride.

8. A composition of irritating and disabling agents consisting of chloropicrin and chloracetophenone dissolved in a suitable solvent.

9. A composition of irritating and disabling agents consisting of approximately twenty-five parts of chloropicrin and approximately five parts of chloracetophenone dissolved in methylene chloride.

10. The composition as specified in claim 1, additionally including an exothermally reacting agent.

11. The composition as specified in claim 5, additionally including an exothermally reacting agent.

12. The composition as specified in claim 6, additionally including an exothermally reacting agent.

13. A composition of irritating and disabling agents consisting of chloropicrin, chloracetophenone, and an exothermally reacting agent.

14. A composition of irritating and disabling agents consisting of chloropicrin, chloracetophenone, and stannic chloride.

15. A composition of irritating and disabling agents consisting of chloropicrin, chloracetophenone, methylene chloride, and stannic chloride.

16. A composition of irritating and disabling agents consisting of chloropicrin, chloracetophenone, and a chloro-methane compound.

17. A composition of irritating and disabling agents consisting of a comparatively volatile component, a relatively less volatile, more persistent component, and a solvent, the whole combined in such manner that a predetermined high initial concentration of deterrent agencies will be formed when said composition is projected and a residue will be left which will be dispersed at a comparatively slow rate to maintain an irritating and disabling atmosphere at desired high concentration for a relatively long period of time, and said solvent exerting a regulatory effect on the vapor pressures and the evaporation of said irritating and disabling agents.

18. A composition of irritating and disabling agents consisting of chloropicrin, chloracetophenone, and a solvent, said solvent exerting a regulatory effect on the vapor pressures and the evaporation of said irritating and disabling agents.

KENNETH A. KOBE.